US 6,655,951 B1

(12) United States Patent
Küpper

(10) Patent No.: US 6,655,951 B1
(45) Date of Patent: Dec. 2, 2003

(54) APPARATUS FOR PRODUCING HOLLOW ARTICLES BY THE SUCTION-BLOWING PROCESS

(75) Inventor: Rudolf Küpper, Neunkirchen-Seelscheid (DE)

(73) Assignee: SIG Kautex GmbH & Co., Bonn (DE)

( * ) Notice: Subject to any disclaimer, the term of this patent is extended or adjusted under 35 U.S.C. 154(b) by 0 days.

(21) Appl. No.: 09/570,151

(22) Filed: May 12, 2000

(30) Foreign Application Priority Data

May 15, 1999  (DE) .......................... 199 22 490

(51) Int. Cl.[7] .......................... B29C 49/04; B29C 31/08
(52) U.S. Cl. .................. 425/532; 264/542; 425/534
(58) Field of Search ................ 264/540, 542; 425/532, 534

(56) References Cited

U.S. PATENT DOCUMENTS

| 4,340,345 | A | * | 7/1982 | Schurman | .................. | 264/532 |
| 4,865,799 | A | * | 9/1989 | Sadr | .................. | 264/540 |
| 5,700,498 | A | * | 12/1997 | Renzo et al. | .................. | 425/532 |
| 5,932,166 | A | * | 8/1999 | Bousselin et al. | .................. | 425/532 |
| 6,176,699 | B1 | * | 1/2001 | Franjo et al. | .................. | 425/534 |
| 6,183,683 | B1 | * | 2/2001 | Schwochert | .................. | 264/534 |

FOREIGN PATENT DOCUMENTS

| DE | 36 20 147 | 12/1987 |
| DE | 36 35 334 | 4/1988 |
| DE | 37 22 340 | 1/1989 |
| JP | 61-287709 | 12/1986 |

OTHER PUBLICATIONS

DEZ "Plastverarbeiter", vol. 44, 1993, Nr. 12, pp. 46 to 49.
DEZ "Plastverarbeiter", vol. 49, Nr. 7, pp. 56 to 59, no date.

* cited by examiner

*Primary Examiner*—Robert Davis
(74) *Attorney, Agent, or Firm*—Herbert Dubno

(57) ABSTRACT

Hollow articles of thermoplastic synthetic resin are produced by suction-blowing in an apparatus in which the shaping is decoupled from the extrusion. A preform handler, especially a six-axis robot, engages the preform at the extrusion or coextrusion head and carries it to the closed mold into which the preform is sucked by suction generated in the mold cavity. While shaping is effected in the mold, extrusion can continue at the head to form a further preform.

5 Claims, 4 Drawing Sheets

US 6,655,951 B1

APPARATUS FOR PRODUCING HOLLOW ARTICLES BY THE SUCTION-BLOWING PROCESS

FIELD OF THE INVENTION

My present invention relates to a method of and an apparatus for the production of hollow articles of thermoplastic synthetic resin by a suction-blowing process is which a tubular preform of the thermoplastic synthetic resin material is received between two mold halves which can be moved relatively into open and closed positions, can be locked in a closed position so that the preform is located within the mold cavity defined between the mold half, at least the lower side of the mold cavity can be closed by a slider, suction can be applied at least at the lower portion of the mold and the preform, subject to the suction and enclosed in the mold is expanded by the blowing or by reason of the expansion of the previously preblown preform under the pressure reduction brought about by the suction in the mold.

BACKGROUND OF THE INVENTION

The suction-blowing process used heretofore for the production of hollow articles from thermoplastic synthetic resin generally has provided the shaping tool, i.e. the mold or die, directly adjacent the extrusion head or coextrusion head from which the tubular preform of thermoplastic synthetic resin emerges, usually downwardly. The tubular extrusion can be an extrusion of one material or can be formed by coextrusion, i.e. with one thermoplastic material laminated over another in the extrusion process.

The hanging tubular preform in the extrusion or coextrusion head can be drawn into or through the closed blow-molding tool by suction until the tubular preform, with the aid of the suction cushion, arrives at its final position in the mold. The mold is then closed at the side of the extrusion head and blowing can be effected.

A suction-blowing machine has a number of advantages over a conventional blow-molding machine as will be apparent, for example, from German patent document DE 37 22 340 A1. Since the tubular preform is drawn by suction into a closed blow mold, is undesirable squeezing of the tubular preform cannot occur. Such squeezing is common when the blow mold is closed on a preform in the conventional blow-molding operation without the suction facility described above. Since the suction-blown article also does not have a weld seam, the mold-closing force need only be sufficient to hold the mold closed against the blowing pressure which may result, as noted, by application of suction externally of the hollow body. The closing operation, therefore, requires significantly lower pressure than for closing a mold onto a synthetic resin tube. Furthermore, expensive mold locks with position and speed controllers can be eliminated. Such devices are essential for conventional blow-molding machines in which the mold halves close upon the synthetic resin material and form seams in the finished body.

A further drawback of earlier systems resulting from the fact that the mold operates discontinuously, is that the extrusion head must be capable of storing the thermoplastic synthetic resin which is generally fed continuously by one or more screw or worm extruders. The expensive storage head must be capable of ejecting the tubular preform rapidly, generally over a period of several seconds, as may be required for the suction-blowing operation so that excessive storage of the thermoplastic is avoided. The storage head therefore must have sufficient storage capacity for the thermoplastic synthetic resin which would be extruded until the mold reopens and the finished article is removed. The storage space requires a piston for discharging the stored thermoplastic.

Such systems as described in German patent documents DE 36 20 144 A1 and DE 36 35 334 A1 create a variety of operational preforms and, of course, are expensive and require significant maintenance.

OBJECTS OF THE INVENTION

It is, therefore, the principal object of the present invention to provide an improved method of and apparatus for the production of hollow articles from thermoplastic synthetic resin material which avoids the drawbacks of the earlier system and can operate more efficiently in a suction-blowing mode than has hitherto been the case.

More specifically, it is an object of the invention to provide a method of suction-blowing hollow articles from thermoplastic synthetic resin materials whereby the procedure is simplified, the articles are made with greater precision, and problems hitherto encountered and resulting from the need to store thermoplastic synthetic resin at the extrusion head are avoided.

It is also an object of the invention to provide an apparatus for producing hollow articles by the suction-blowing process which enables both extrusion and shaping of the tubular preform to be carried out more simply and with better control than has hitherto been the case.

SUMMARY OF THE INVENTION

These objects and others which will become apparent hereinafter are attained, in accordance with the invention by decoupling the material-shaping part of the method from the extrusion part of the method and thereby enabling a tubular preform which has previously been extruded to be shaped while a tubular preform for a subsequent shaping continues to be extruded by the extrusion head.

In other words with the invention the extrusion or coextrusion resulting in formation of the tubular preform is decoupled from the process of sucking the tubular preform into the cavity and expanding it, i.e. the article-shaping process, so that during the formation of a finished article, a next preform continues to be extruded and continuously or discontinuously can be ejected from the head and is prepared for introduction into the mold cavity. Because of the decoupling of the procedure by which a tubular preform is drawn by suction into the mold and then shaped by suction blowing and the extrusion, numerous advantages can be seen. For example, the suction blowing eliminates the need for a storage head and enables the use of a six-axis robot to be used in combination with the transfer of the preform to a 3D blow mold since the arms of the robot need only engage the preform between the extrusion head and the mold to enable transfer of the preform between the head and the mold. The invention allows sequential coextrusion with two materials of different stiffness and hence with different expulsion rates from the coextrusion head, since the extrusion rate need not be matched to the shaping operation or vice versa. The matching of cycling times of the extrusion head and the shaping unit is no longer necessary since the six-axis robot can pick up the tubular preform at any point for the transfer.

The method thus comprises the steps of:

(a) extruding a tubular blow-moldable thermoplastic synthetic resin preform with an extrusion head supplied with the thermoplastic synthetic resin by at least one extruder;

(b) transferring the tubular preform to a mold cavity formed by closing two mold halves and displacing a slider across the mold cavity at least at a bottom of the mold cavity;

(c) drawing a suction in the mold cavity at a lower portion thereof;

(d) blowing the tubular preform in the cavity to shape an article therefrom; and (e) during steps (b) through (d) extruding another tubular preform for subsequent shaping into an article whereby the shaping of preforms into articles is decoupled from the extrusion of preforms and simultaneously with the shaping of the preforms, tubular preforms are continuously or discontinuously extruded by the head.

An apparatus according to the invention can comprise:

an extrusion head connected to at least one extruder for extruding a tubular blow-moldable thermoplastic synthetic resin preform;

a mold spaced from the head and having a mold cavity adapted to receive the tubular preform, a slider being displaceable across the mold cavity at least at a bottom of the mold cavity;

means connected with the mold for drawing a suction in the mold cavity at a lower portion thereof; and a preform handler positioned to grip a preform extruded by the head for transferring the preform to the cavity for shaping into an article whereby the shaping of preforms into articles is decoupled from the extrusion of preforms and simultaneously with the shaping of the preforms, tubular preforms are continuously or discontinuously extruded at the head.

With this apparatus, a preform handler which can be a six-axis robot, is provided for removing the tubular preform from the extrusion or coextrusion head and carrying it to the article cavity. The use of the preform holder, which can be a fully programmable six-axis robot, the suction-blowing machine is associated with the extruder/coextruder but has its shaping part decoupled therefrom so that the extrusion or coextrusion head can continue to prepare a further tubular preform during the period in which the handler carries a previously produced preform to the shaping components and returns to the head.

According to a feature of the invention, the handler is raisable and lowerable and thus its arms can be brought into the region of the nozzle of the head or displaced toward the mold which lies below the head. Once the tubular preform is picked up by the arms, extrusion can continue. The handler advantageously can be equipped with means for cutting, welding and/or preblowing the tubular preform, thereby eliminating the need for a separate cutting device for separating the desired length of extruded material as the respective preform from the continuously extruded tube. The preblowing on the handler, e.g. with the aid of a blowing piercer which is integrated into the handle, facilitates the insertion of the tubular preform into the cavity of the closed blow mold and thus permits a calibration of the article.

It has been found to be advantageous to provide the preform handler with two gripper arms movable toward and away from one another and which are configured with complementary half-shell-shaped cavities in which vacuum nozzles open. Following the removal of a preform from the head and closure of the gripper arms so that the preform is squeezed closed at the head and is held by the arms, the application of suction of these nozzles causes an expansion of the end of the tubular preform held in the last-mentioned cavity so that the preform walls are drawn against the cavity walls. The expanded end of the tubular preform is thereby stabilized and the piercing tool can thus be pressed into the stabilized end to enable preblowing of the preform.

BRIEF DESCRIPTION OF THE DRAWING

The above and other objects, features, and advantages will become more readily apparent from the following description, reference being made to the accompanying drawing in which.

SPECIFIC DESCRIPTION

Figure 3:
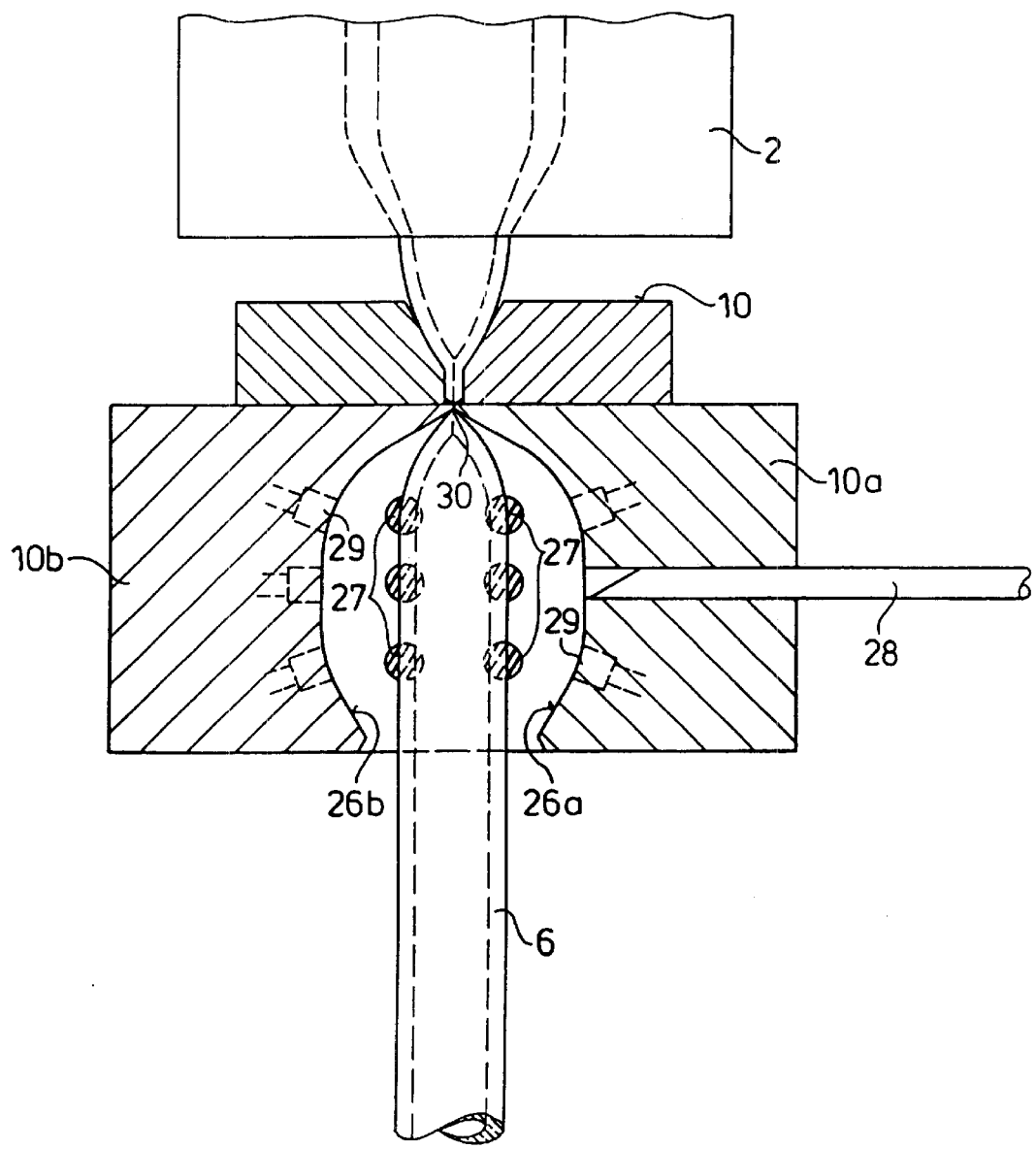
FIG. 3 is a view similar to FIG. 2 after closure of the arms and prior to expansion of the preform end by the application of suction.

The suction-blowing machine shown in FIG. 3 only with respect to the parts important to the present invention, comprises an extrusion or coextrusion head 2 which can be connected to at least one worm or similar extruder 30. The extrusion or coextrusion head delivers the synthetic resin material required for producing the hollow article in a molten state via a distributor represented at 31 to a number of such heads, all of which are associated with respective shaping tools or molds represented at 8 and shown to be located below the respective extrusion or coextrusion head 2. The tubular preforms are removed as extruded tube sections 6 and are introduced by the handler 10 into the article cavity 20 formed by the two mold halves 7a and 7b of the mold 8.

The removal of the preform 6 from the extrusion head 2 and its introduction into the mold 8 is effected by a movement of the handler 10 represented by the double-headed arrow 9, i.e. an up and down or raising or lowering movement.

The tubular preform should not be torn away from the continuous extrusion but rather may be cut therefrom, welded shut or preblown. The mold halves 7 and 8 are displaceable by hydraulic closing cylinders and can be provided with a locking unit for retaining the mold closed during expansion of the preform.

Figure 1:
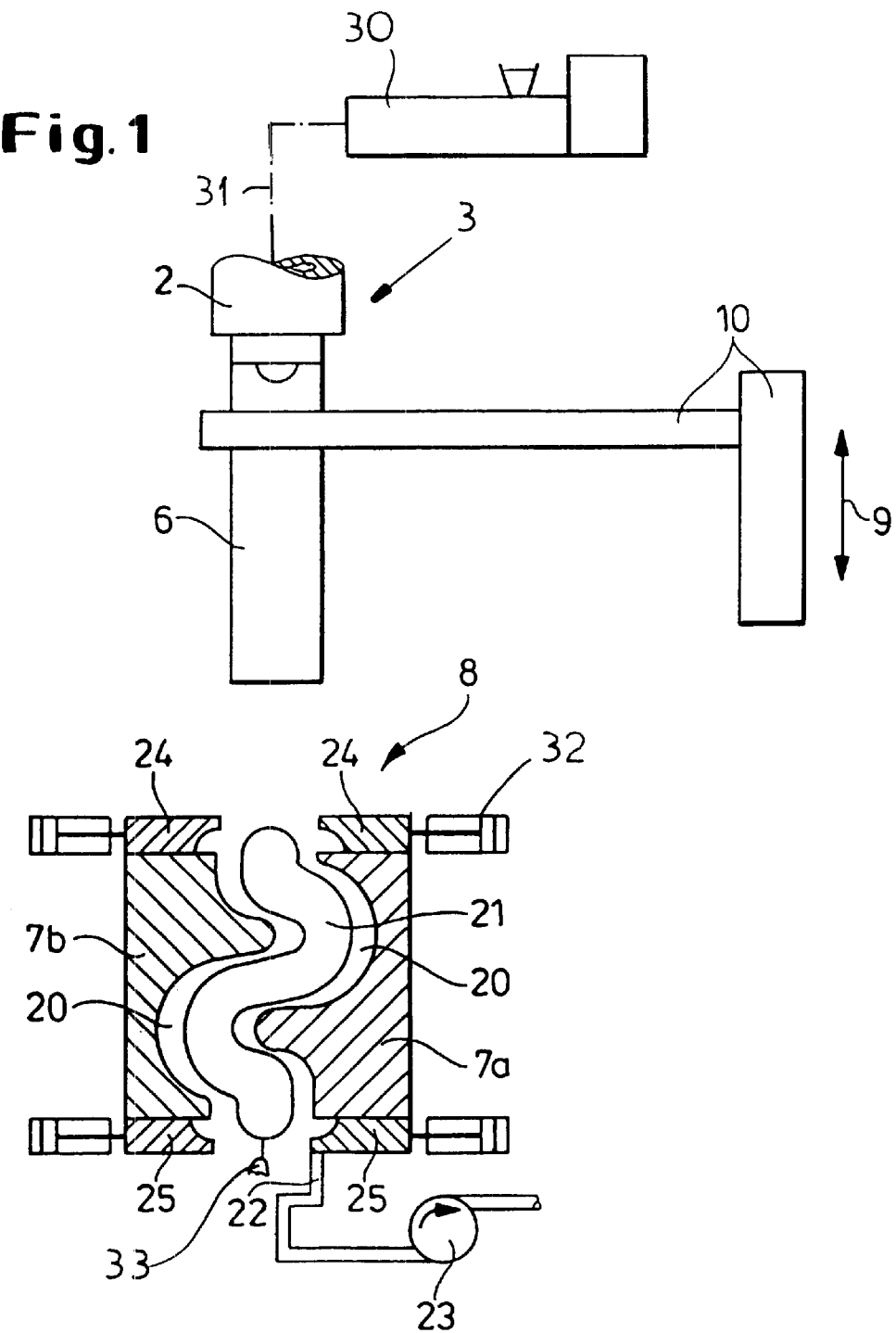
FIG. 1 is a detail of a suction-blowing machine showing the workpiece in an open position for removal of a previously-shaped article and the preform handler about to remove a segment of the extruded tube as the next preform.

In FIG. 1, the finished article 21 is about to be removed from the open mold. For receiving a new tubular preform, after removal of the article 21, the blow mold 8 is closed and sliders 24 and 25 operated by respective cylinders 32 can be closed as well to terminate the cavity, the sliders 24 being closed after the cavity has been inserted.

At a lower side of the mold, after the sliders 25 have been closed, suction is applied by the suction source 23 to the cavity 20 via an adapter 22. During the sucking of the new preform into the cavity 20, closed between the mold halves 7a and 7b and by the sliders 25, preblown air can be blown into the preform 6. The sucking process may be augmented by the use of a gripper 33 to help position the preform in the mold cavity. The preform handler 10 is then returned to its starting position.

As soon as the preform is in the proper position within the cavity 20, sliders 24 are closed and the preblowing air is cut off. The preform 6 is formed into the finished article 21 with blowing air via a blowing needle entering the preform in the mold cavity 20 or simply by the suction applied in the mold cavity 20 by the vacuum pump 23.

After cooling of the finished article 21, the mold halves 7a and 7b are opened (FIG. 1) so that the gripper 33 can remove the finished article 21 and deliver it to a subsequent station, e.g. for stamping or after cooling.

Figure 2:
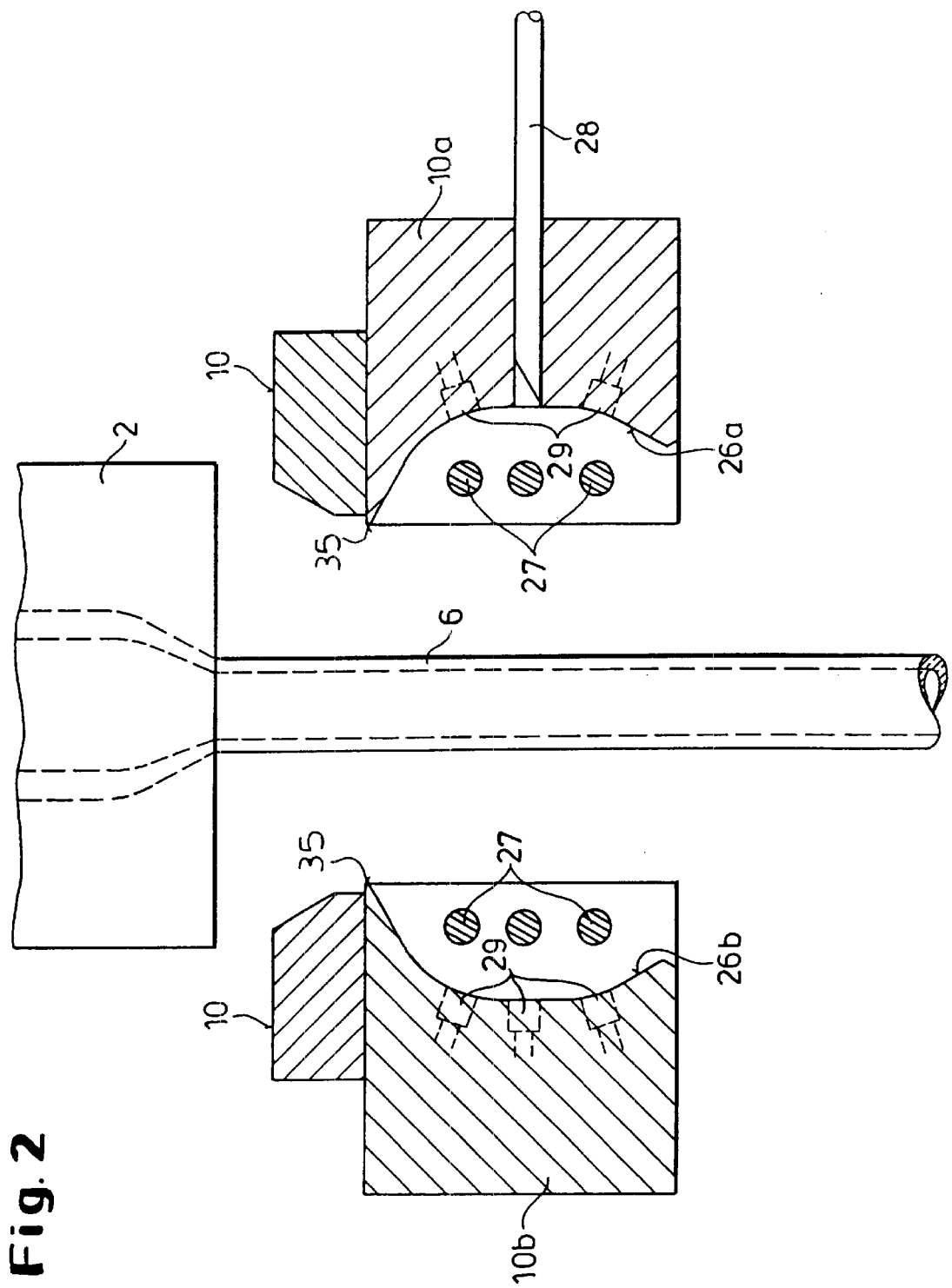
FIG. 2 is a cross sectional view showing the details of the gripper arms of the handler in their open positions before engagement with the extruded tube.
Figure 4:
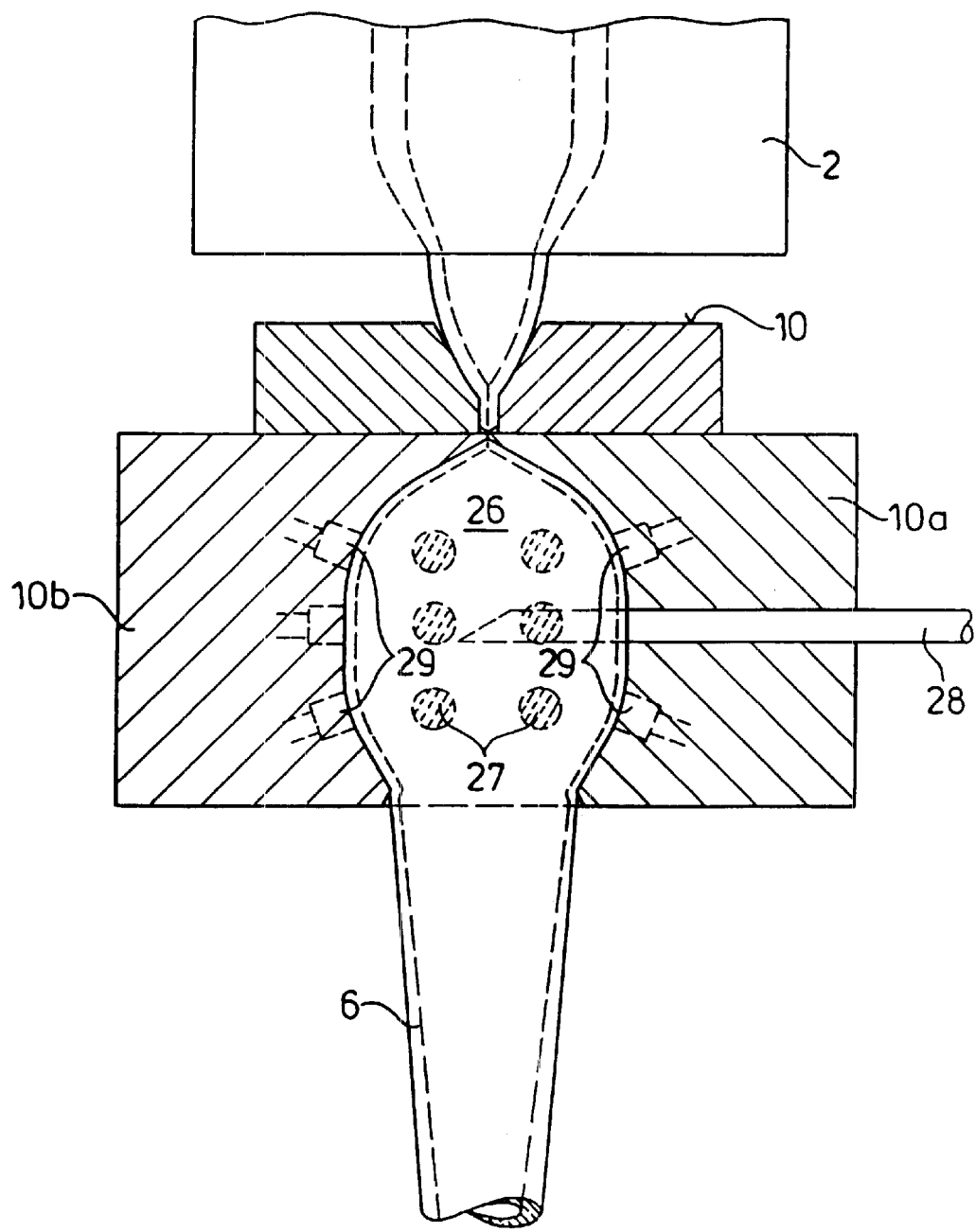
FIG. 4 is a view similar to FIG. 2 but showing the arms of the handler closed, the preform enlarged by suction and the piercing needle inserted through the preform wall for preblowing of the preform.

The extrusion or coextrusion head 2 is arranged at a distance above the mold 8 and for the next suction blowing process, after removal of an article 21, the raisable and lowerable holder 10 carries a new preform to the mold. During the shaping process in the mold the extrusion is continuously or discontinuously produced at the head. FIGS. 2–4 show the various positions of the preform handler. In FIG. 2, the arms 10a and 10b of the preform handler are shown in their open position and located on opposite sides of the extrusion with their half shell cavities 26a and 26b turned toward the extrusion. Suction nozzles 27 are connected via lines 29 to a vacuum source not shown. The gripper arm 10 is provided, in addition, with a blowing piercer in the form of a needle 28 whose sharp point can pass through the wall of the preform.

When the arms are closed, the leading edges 35 squeeze the extruded tube closed and weld it shut (FIG. 3) so that the separated tubular preform 6 hangs from the arms 10a, 10b. Suction applied via lines 29 expand the preform (FIG. 4) so that it lies along the cavity walls 26a, 26b and is stabilized for piercing by the needle 28 to enable preblowing thereof.

I claim:

1. An apparatus for producing hollow articles of thermoplastic synthetic resin by suction-blowing, comprising:

an extrusion head connected to at least one extruder for extruding a tubular blow-moldable thermoplastic synthetic resin preform;

a mold spaced from said head and having a mold cavity adapted to receive said tubular preform, a slider being displaceable across said mold cavity at least at a bottom of the mold cavity;

means connected with said mold for drawing a suction in said mold cavity at a lower portion thereof;

a preform handler positioned to grip a preform extruded by said head for transferring the preform to said cavity for shaping into an article whereby the shaping of preforms into articles is decoupled from the extrusion of preforms and simultaneously with the shaping of the preforms, tubular preforms are continuously or discontinuously extruded at said head; and a blowing piercer for penetrating and blowing said preform.

2. The apparatus defined in claim 1 wherein said head is located above said mold, said preform handler being raisable and lowerable.

3. The apparatus defined in claim 2 wherein said preform handler is provided with means for cutting and/or welding a tubular preform gripped thereby.

4. The apparatus defined in claim 3 wherein said preform handler is a six-axis robot.

5. An apparatus for producing hollow articles of thermoplastic synthetic resin by suction-blowing, comprising:

an extrusion head connected to at least one extruder for extruding a tubular blow-moldable thermoplastic synthetic resin preform;

a mold spaced from said head and having a mold cavity adapted to receive said tubular preform, a slider being displaceable across said mold cavity at least at a bottom of the mold cavity;

means connected with said mold for drawing a suction in said mold cavity at a lower portion thereof;

a preform handler positioned to grip a preform extruded by said head for transferring the preform to said cavity for shaping into an article whereby the shaping of preforms into articles is decoupled from the extrusion of preforms and simultaneously with the shaping of the preforms, tubular preforms are continuously or discontinuously extruded at said head; and a means for blowing said preform.

* * * * *